(12) United States Patent
Morita

(10) Patent No.: US 9,229,282 B2
(45) Date of Patent: Jan. 5, 2016

(54) LIQUID CRYSTAL DISPLAY DEVICE

(71) Applicant: Japan Display Inc., Minato-ku (JP)

(72) Inventor: Shin Morita, Ishikawa-ken (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/587,296

(22) Filed: Dec. 31, 2014

(65) Prior Publication Data

US 2015/0116646 A1 Apr. 30, 2015

Related U.S. Application Data

(62) Division of application No. 13/706,545, filed on Dec. 6, 2012, now Pat. No. 8,976,309.

(30) Foreign Application Priority Data

Dec. 20, 2011 (JP) .................. 2011-278794

(51) Int. Cl.
  *G02F 1/1345* (2006.01)
  *G02F 1/1343* (2006.01)
  *G02F 1/1362* (2006.01)

(52) U.S. Cl.
  CPC ...... *G02F 1/134309* (2013.01); *G02F 1/13452* (2013.01); *G02F 1/134336* (2013.01); *G02F 1/136204* (2013.01); *G02F 1/136277* (2013.01); *G02F 1/136286* (2013.01)

(58) Field of Classification Search
  CPC .......................... G02F 1/13452; G02F 1/1345
  See application file for complete search history.

(56) References Cited

U.S. PATENT DOCUMENTS 6,111,620 A * 8/2000 Nishiki ............ G02F 1/136204
324/760.01

FOREIGN PATENT DOCUMENTS

| JP | H4-304429 | 10/1992 |
| JP | H9-230383 | 9/1997 |
| JP | H11-194368 | 7/1999 |
| JP | 2005-164854 A | 6/2005 |
| JP | 2011-100011 | 5/2011 |

OTHER PUBLICATIONS

Office Action issued Nov. 6, 2013 in Japanese Patent Application No. 2011-278794 filed Dec. 20, 2011 in English.

* cited by examiner

*Primary Examiner* — Phu Vu

(74) *Attorney, Agent, or Firm* — Oblon, McClelland, Maier & Neustadt, L.L.P.

(57) ABSTRACT

In one embodiment, a first wiring line is pulled out from an active area, and a short ring circuit is provided in a peripheral portion of the active area. A first electrode is formed in the same layer as the first wiring line. A semiconductor layer is formed on the first electrode. A portion of a second electrode faces the first electrode through an insulating layer and arranged on the semiconductor layer. A third electrode is arranged on the semiconductor layer in the same layer as the second electrode. The first electrode includes a cutout portion arranged under an edge of the second electrode.

28 Claims, 4 Drawing Sheets

LIQUID CRYSTAL DISPLAY DEVICE

CROSS-REFERENCE TO RELATED APPLICATION

This application is a divisional of U.S. application Ser. No. 13/706,545 filed Dec. 6, 2012, and is based upon and claims the benefit of priority from prior Japanese Patent Application No. 2011-278794, filed Dec. 20, 2011, the entire contents of which are incorporated herein by reference.

FIELD

Embodiments described herein relate generally to a liquid crystal display device.

BACKGROUND

A liquid crystal display device is equipped with a pair of substrates facing each other and a liquid crystal layer held therebetween. The pair of substrates is attached by seal material arranged so that the seal material surrounds an active area containing display pixels arranged in the shape of a matrix. The liquid crystal layer is held in an area surrounded by the seal material between the pair of substrates.

The liquid crystal display device is manufactured through a plurality of processes, such as a process of forming a first substrate, a process of forming a second substrate, and a process of attaching the first substrate and the second substrate together. When static electricity is impressed to an electric conductor formed in the substrate during the manufacturing processes or after the manufacturing, the conductor or a resin layer may be broken by the static electricity. Accordingly, there is a possibility of lowering of manufacturing yield and reliability of the display device.

On the other hand, in the liquid crystal display device, it is desired to make the liquid crystal layer thin by setting a gap between the substrates small in recent years for improving high-speed response and viewing angle characteristic. Furthermore, it is also desired to make an outside dimension small by narrowing a frame surrounding the active area. Therefore, it is reviewed to make distance from the seal material to an active area small while making width of the seal material narrow.

There was a possibility that function to block impurities entering into the liquid crystal layer from outside by the seal material is reduced if the width of the seal material is formed small. When the liquid crystal layer is made thin and contaminated by the impurities, there is a possibility that current flows in the liquid crystal layer due to a potential difference generated between the substrates, and that a conductive layer and a resin layer in the circumference of the liquid crystal layer corrode.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

Figure 1:
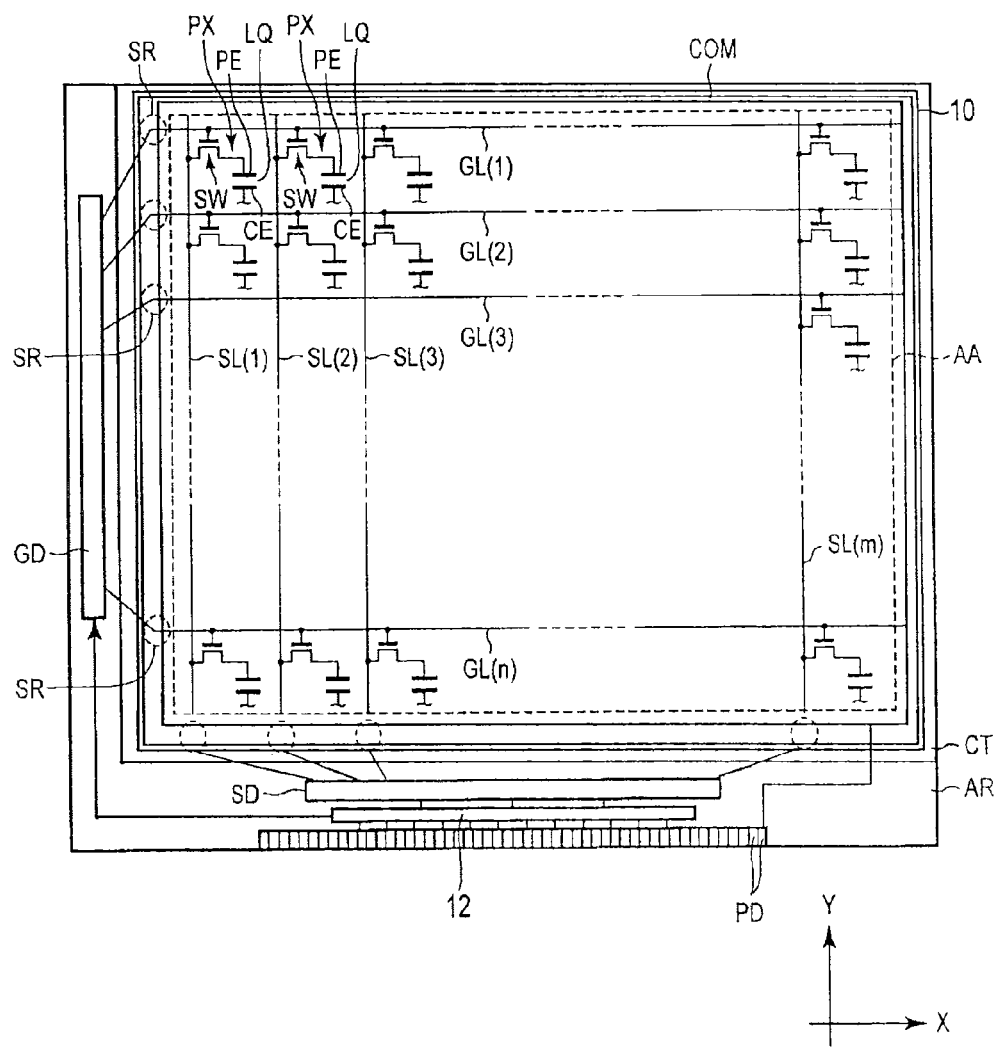
FIG. 1 is a figure schematically showing a structure of a liquid crystal display device and an equivalent circuit thereof according to an embodiment.

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device includes: an array substrate including an active area formed of a plurality of pixel electrodes arranged in a matrix, a first wiring line pulled out from the active area, and a short ring circuit provided in a peripheral portion of the active area; a counter substrate arranged facing the array substrate and including a common electrode facing the pixel electrode; and a liquid crystal layer held between the array substrate and the counter substrate; wherein the short ring circuit includes, a first electrode formed in the same layer as the first wiring line, a semiconductor layer on the first electrode, a second electrode, a portion of the second electrode facing the first electrode through an insulating layer and arranged on the semiconductor layer, a third electrode arranged on the semiconductor layer in the same layer as the second electrode, and the first electrode includes a cutout portion arranged under the second electrode.

FIG. 1 is a figure schematically showing a structure of the liquid crystal display device and an equivalent circuit thereof according to an embodiment. The liquid crystal display device is equipped with an active-matrix type liquid crystal display panel LPN.

The liquid crystal display panel LPN is equipped with an array substrate AR which is a first substrate, a counter substrates CT which is a second substrate facing the array substrate AR, and a liquid crystal layer LQ held therebetween. The liquid crystal display panel LPN is equipped with an active area AA which displays images. The active area AA is constituted by a plurality of pixels PX arranged in the shape of a (m×n) matrix (here, "m" and "n" are positive integers).

The liquid crystal display panel LPN is equipped with "n" gate lines GL (GU(1)-GL(n)), "m" source lines SL (SL(1)-SL(m)), etc., in the active area AA. The gate lines GL linearly extend in a first direction X, for example. The gate lines GL are arranged in turns along a second direction Y that orthogonally intersects the first direction X. The source lines SL cross the gate lines GL. The source lines SL linearly extend in the second direction Y. The gate lines GL and the source lines SL do not necessarily extend linearly, and a portion thereof may be crooked partially.

Each gate line GL is pulled out to outside of the active area AA and connected to a gate driver GD. Each source line S is pulled out to the outside of the active area AA and connected to a source driver SD. At least a portion of the gate driver GD and the source driver SD is formed in the array substrate AR, for example, and is connected with a driver IC chip 12 equipped with a controller. The drive IC chip 12 outputs control signals, such as a clock signal and a horizontal synchronizing signal to the gate driver GD, and outputs control signals such as a clock signal and a vertical synchronizing signal, and image signals to the source driver SD. Control signals and image signals are inputted to the driver IC chip 12 from exterior through a connection pad PD.

Each pixel PX is equipped with a switching element SW, a pixel electrode PE, a common electrode CE, etc. In addition, in the liquid crystal display panel LPN according to this embodiment, while the pixel electrode PE is formed in the array substrate AR, the common electrode CE is formed in the counter substrate CT, and liquid crystal molecules of the liquid crystal layer LQ are switched using electric field formed between the pixel electrodes PE and the common electrodes CE.

The switching element SW is formed of an n channel type thin film transistor (TFT) and electrically connected with the gate line GL and the source line SL. The switching element SW is equipped with a semiconductor layer formed of polysilicon or amorphous silicon. In addition, the switching elements SW may be any of a top-gated type and a bottom-gated type.

The pixel electrode PE is arranged in each pixel PX, and electrically connected with the switching element SW. The common electrode CE is arranged in common to the pixel electrodes PE of the plurality of pixels PX through the liquid crystal layer LQ. Although the pixel electrode PE and the common electrode CE are formed of electric conductive materials which have light transmissive characteristics, such as Indium Tin Oxide (ITO) and Indium Zinc Oxide (IZO), they may be formed with other metal materials, such as aluminum, silver, molybdenum, aluminum, tungsten, and titanium, and alloy metals thereof according to a display mode of the liquid crystal display device.

In the array substrate AR, a short ring circuit SR to be mentioned later is arranged between the active area AA and the gate driver GD, and between the active area AA and the source driver SD in a peripheral region of the active area AA. The short ring circuit SR is arranged inside region surrounded with the seal material 10.

Moreover, the array substrate AR is equipped with a common wiring COM arranged so that the common wiring COM surrounds the active area AA in the peripheral region of the active area AA. The common wiring COM is electrically connected with the connection pad PD. Common voltage is supplied to the common wiring COM from exterior through the connection pad PD.

The common electrode CE is arranged facing the plurality of pixel electrodes PE in the active area AA and electrically connected with the common wiring COM in the array substrate AR through an electric conductive component which is not illustrated.

Figure 2:
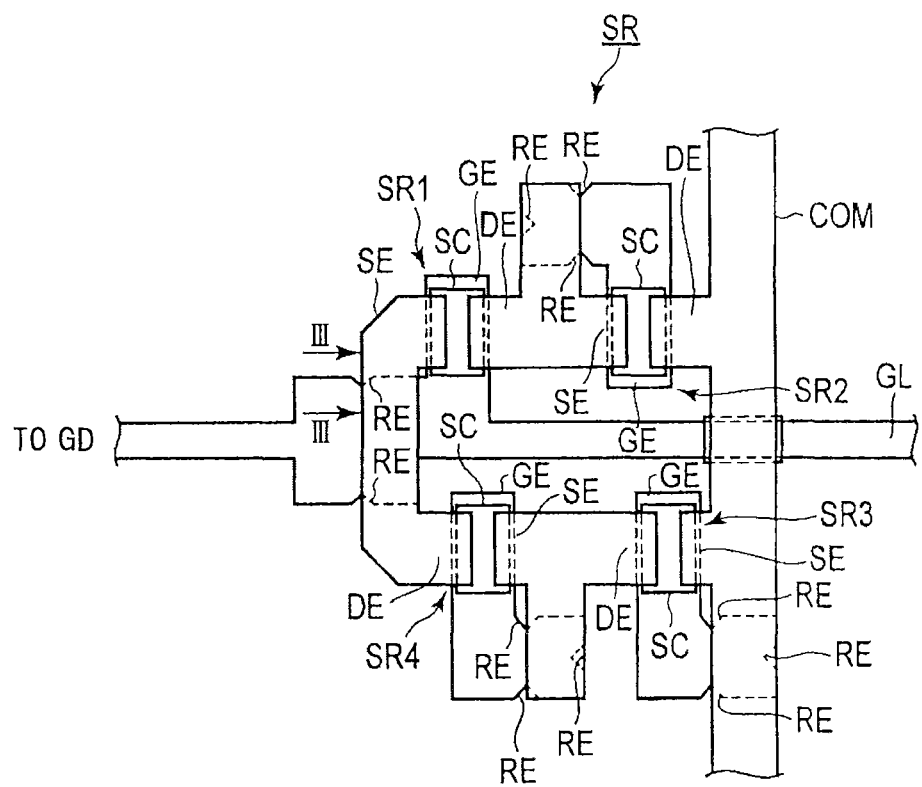
FIG. 2 is a figure showing a structure of a short ring circuit of the liquid crystal display device shown in FIG. 1 according to a first embodiment.

FIG. 2 is a figure showing a structure of the short ring circuit SR of the liquid crystal display device shown in FIG. 1 according to a first embodiment. FIG. 2 shows the short ring circuit SR provided in a path in which the gate line GL extends from the active area AA to the gate driver GD.

The short ring circuit SR includes a first circuit SR1, a second circuit SR2, a third circuit SR3 and a fourth circuit SR4 which control static electricity energy, respectively.

The first circuit SR1 to the fourth circuit SR4 have a gate electrode (first electrode) GE, a semiconductor layer SC arranged on the gate electrode GE, and a source electrode (second electrode) SE and a drain electrode (third electrode) DE arranged on the semiconductor layer SC, respectively.

The gate electrode GE of the first circuit SR1 is electrically connected with the gate line GL or integrally formed. The source electrode SE of the first circuit SR1 is electrically connected with the drain electrode DE of the fourth circuit SR4 or integrally formed. The drain electrode DE of the first circuit SR1 is electrically connected with the source electrode SE of the second circuit SR2 or integrally formed, and a portion thereof is arranged on the gate electrode GE of the second circuit SR2.

Figure 3:
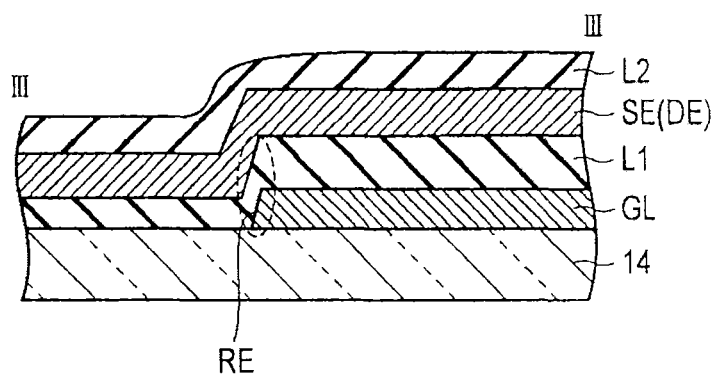
FIG. 3 is a figure schematically showing a cross-sectional view of an array substrate taken along line III-III in FIG. 2.

The drain electrode DE of the second circuit SR2 is electrically connected with the common wiring COM or integrally formed. The respective gate electrode GE and the source electrode SE of the second circuit SR2 extend from a switching transistor constituting the second circuit SR2 so as to cross each other apart from the switching transistor. The source electrode SE of the second circuit SR2 (drain electrode DE of the first circuit SR1) overlaps with the gate electrode GE of the second circuit SR2. In the crossing portion, the gate electrode GE of the second circuit SR2 has cutout portions RE provided under edges of the source electrode SE of the second circuit SR2 (drain electrode DE of the first circuit SR1). That is, the edges of the gate electrode GE of the second circuit SR2 cross the edges of the source electrode SE of the second circuit SR2 (the drain electrode DE of the first circuit SR1). The cutout portions RE are arranged where the edges of the source electrode SE of the second circuit SR2 face the edges of the gate electrode GE of the second circuit SR2 through an insulating layer L1 as shown in FIG. 3.

A portion of the gate electrode GE of the third circuit SR3 extending from the switching transistor is arranged under the common wiring COM so as to cross. The source electrode SE of the third circuit SR3 is electrically connected with the common wiring COM or integrally formed. While the drain electrode DE of the third circuit SR3 is electrically connected with the source electrode SE of the fourth circuit SR4 or integrally formed, a portion of the drain electrode DE of the third circuit SR3 (source electrode SE of the fourth circuit SR4) is arranged on the gate electrode GE of the fourth circuit SR4 so as to cross. The gate electrode GE of the third circuit SR3 is provided with the cutout portions RE under an edge of the common wiring COM which crosses edges of the gate electrode GE through the insulating layer L1.

A portion of the gate electrode GE of the fourth circuit SR4 extending from the switching transistor is arranged under the source electrode SE of the fourth transistor SR4 so as to cross. The gate electrode GE of the fourth circuit SR4 is provided with the cutout portions RE under edges of the source electrode SE of the fourth circuit SR4 which cross edges of the gate electrode DE through the insulating layer L1.

The fourth circuit SR4 and the first circuit SR1 are arranged on both sides of the gate line GL, and the drain electrode DE of the fourth circuit SR4 and the source electrode SE of the first circuit SR1 extend in a direction which intersects the gate line GL. The gate line GL has cutout portions RE provided under an edge of the source electrode SE of the first circuit SR1 (drain electrode DE of the fourth circuit SR4). The cutout portions RE are formed in positions where an edge of the source electrode SE of the first circuit SR1 crosses the edges of the gate electrode GE of the first circuit SR1 through the insulating layer L1.

In addition, in the short ring circuit SR shown in FIG. 2, although portions of the gate electrode GE are removed in the shape of a triangle to form the cutout portion RE, and are depressed in a mountain shape in the short ring circuit SR shown in FIG. 2, the form of the cutout portion RE is not restricted to this.

FIG. 3 is a figure showing an example of a cross section of the array substrate AR taken along line III-III in FIG. 2. An array substrate AR has a transparent insulating substrate 14. The gate line GL is arranged on the transparent insulating substrate 14. The cutout portion RE is formed at the edge of the gate line GL. The insulating layer L1 is arranged on the gate line GL, and the source electrode SE of the first circuit SR1 (drain electrode DE of the fourth circuit SR4) is arranged on the insulating layer L1. That is, a step portion of the insulating layer L1 is formed. An insulating layer L2 is arranged on the source electrode SE of the first circuit SR1 (drain electrode DE of the fourth circuit SR4). The insulating layers L1 and L2 are formed of, for example, a silicon nitride layer or a resist layer.

The thickness of the insulating layer L1 becomes thin along the edge of the gate line GL in which the cutout portion RE is provided. Accordingly, the insulating layer L1 between the edge of the gate line GL and the source electrode SE of the first circuit SR1 becomes thin.

Here, when static electricity is impressed to the gate line GL from the gate driver GD side, since the static electricity has large energy, the gate line GL and the source electrode SE of the first circuit SR1 is electrically connected by break down of the insulating layer L1 in a circumference of the cutout portion RE in which the insulating layer L1 becomes thin. In the cutout portion RE, electric field between the gate line GL and the source electrode SE of the first circuit SR1 is strengthen due to the depressed shape of the gate line GL. Since the voltage by the static electricity is impressed to the gate electrode GE of the first circuit SR1, the source electrode SE and the drain electrode DE of the first circuit SR1 are electrically connected through the semiconductor layer SC. Therefore, the static electricity flows from the source electrode SE to the drain electrode DE of the first circuit SR1.

When the static electricity impressed to the drain electrode DE of the first circuit SR1 has still large energy, the source electrode SE of the second circuit SR2 (drain electrode DE of the first circuit SR1) and the gate electrode GE of the second circuit SR2 are electrically connected by break down of the insulating layer L1 in a circumference of the cutout portion RE formed in the edges of the gate electrode GE of the second circuit SR2. Accordingly, the static electricity is impressed from the source electrode SE to the drain electrode DE of the second circuit SR2 through the semiconductor layer SC with the voltage impressed to the gate electrode GE because the drain electrode DE of the first circuit SR1 and the source electrode SE of the second circuit SR2 are electrically connected. The static electricity flows from the source electrode SE to the drain electrode DE of the second circuit SR2. Since the drain electrode DE of the second circuit SR2 is electrically connected with the common wiring COM, the static electricity which passed the second circuit SR2 is impressed to the common wiring COM. The common wiring COM is hard to be destroyed even if it is a case where the static electricity is impressed since wiring width thereof is wider and its capacitance is larger as compared with other wirings. Therefore, the common wiring COM is connected to the short ring circuit SR.

When the static electricity is impressed from the common wiring COM side to the short circuit SR, the common wiring COM and the gate electrode GE of the third circuit SR3 are electrically connected by break down of the insulating layer L1 in a circumference of the cutout portion RE formed at the edge of the gate electrode GE of the third circuit SR3 under the edge of the common wiring COM. Then, the source electrode SE and the drain electrode DE of the third circuit SR3 are electrically connected through the semiconductor layer SC with the voltage impressed to the gate electrode GE. Since the common wiring COM and the source electrode SE of the third circuit SR3 are electrically connected, the static electricity flows from the source electrode SE to the drain electrode DE of the third circuit SR3.

When the static electricity impressed to the drain electrode DE of the third circuit SR3 has still large energy, the source electrode DE and the gate electrode GE of the fourth circuit SR4 are electrically connected by break down of the insulating layer L1 in a circumference of the cutout portions RE formed at the edge of the gate electrode GE under the edge of the source electrode SE of the fourth circuit SR4. Thereby, the source electrode SE and the drain electrode DE of the fourth electrode SR4 are electrically connected through the semiconductor layer SC with the voltage impressed to the gate electrode GE. Since the drain electrode DE of the third circuit SR3 and the source electrode SE of the fourth circuit SR4 are electrically connected, the static electricity flows from the source electrode SE to the drain electrode DE of the fourth circuit SR4.

When the static electricity impressed to the drain electrode DE of the fourth circuit SR4 has still large energy, in a circumference of the cutout portion RE formed at the edge of the gate line GL, the source electrode SE of the first circuit SR1 and the gate line GL are electrically connected by breakdown of the insulating layer L1. As mentioned above, the static electricity is impressed to the first circuit SR1 and the second circuit SR2 in order, and the energy of the static electricity is controlled. Therefore, it is avoidable that the electric conductive layer, the resin layer, etc., formed in the active area AA are destroyed by the static electricity.

In addition, it is known that the static electricity impressed to the electrode flows along the surface of the electrode. Therefore, it is desirable for the edge of the electrode along the cutout portion RE crosses the edge of the electrode arranged thereon.

According to the short ring circuit SR as mentioned above, it becomes possible to form the short ring circuit SR without using an electric conductive layer which is arranged in the same layer as the pixel electrode PE and to prevent the corrosion of the circuit resulting from the impurities mixed in the liquid crystal layer LQ. That is, since the short ring circuit SR in the liquid crystal display device according to this embodiment is covered with the insulating layer L2 and does not contact the liquid crystal layer LQ, even if it is a case where the impurities are mixed in the liquid crystal layer LQ, the corrosion is prevented. Therefore, according to this embodiment, a reliable liquid crystal display device can be supplied without reducing the manufacturing yield.

Moreover, the above-mentioned short ring circuit SR can be formed by the electric conductive layers formed in the same layer as the gate line GL and the source line SL, and the insulating layers L1 and L2 arranged between the electric conductive layers. Accordingly, it is not necessary to prepare an additional manufacturing process for forming the short ring circuit SR.

Next, the liquid crystal display device according to a second embodiment is explained in detail with reference to drawings. In addition, in the following explanation, the same mark or symbol about the same composition as the liquid crystal display device of the above-mentioned first embodiment is attached, and its explanation is omitted.

Figure 4:
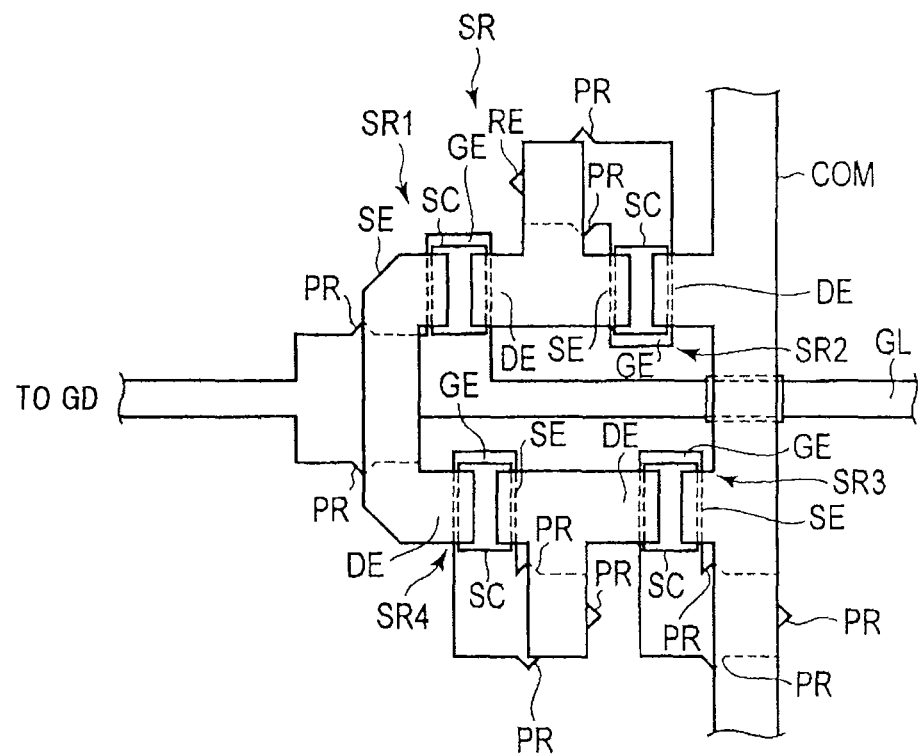
FIG. 4 is a figure showing a structure of the short ring circuit of the liquid crystal display device according to a second embodiment.

FIG. 4 is a figure showing a structure of the short ring circuit of the liquid crystal display device according to the second embodiment. The short ring circuit SR according to this embodiment includes a first circuit SR1 to a fourth circuit SR4.

The gate electrode GE of the second circuit SR2 includes convex portions PR in a mountain shape projecting to a direction substantially in parallel with the substrate surface from the edges of the gate electrode GE under the edges of the source electrode SE of the second circuit SR2 (drain electrode DE of the first circuit SR1).

The convex portions PR are formed in positions where the edges of the source electrode SE and the gate electrode GE of the second circuit SR2 cross each other through the insulating layer L1. The convex portions PR extend to outside of the gate electrode GE.

That is, the source electrode SE and the gate electrode GE of the second circuit SR2 include a portion which faces mutually through the insulating layer L1, and the convex portion PR projects from the facing portion to outside beyond the edge of the source electrode SE.

The gate electrode GE of the third circuit SR3 includes the convex portion PR in a mountain shape projecting in a direction substantially in parallel with the substrate surface from a portion under the edge of the common wiring COM.

The convex portions PR are formed in positions where the edge of the common wiring COM and the edges of the gate electrode GE of the third circuit SR3 cross each other through the insulating layer L1. The convex portions PR project to outside of the gate electrode GE.

That is, the common wiring COM and the gate electrode GE of the third circuit SR3 include a portion which faces mutually through the insulating layer L1, and the convex portion PR projects from the facing portion to outside beyond the edge of the common wiring COM.

The gate electrode GE of the fourth circuit SR4 includes the convex portion PR in a mountain shape projecting in a direction substantially in parallel with the substrate surface from a portion thereof under the source electrode SE of the fourth circuit SR4 (drain electrode DE of the third circuit SR3).

The convex portions PR are formed in positions where the edges of the source electrode SE and the gate electrode GE of the fourth circuit SR4 cross each other through the insulating layer L1. The convex portions PR extend to outside of the gate electrode GE.

That is, the source electrode SE and the gate electrode GE of the fourth circuit SR4 include a portion which faces mutually through the insulating layer L1, and the convex portion PR projects from the facing portion to outside beyond the edge of the source electrode SE.

The gate line GL includes the convex portion PR in a mountain shape projecting to a direction substantially in parallel to the substrate surface from the edge under the source electrode SE of the first circuit SR1 (drain electrode DE of the fourth circuit SR4).

The convex portions PR are formed at the edge of the gate line GL in which the edges of the source electrode SE and the gate electrode GE of the first circuit SR1 cross each other and project to outside from the edge of the gate electrode GE.

That is, the source electrode SE of the first circuit SR1 and the gate line GL include a portion which faces mutually through the insulating layer L1, and the convex portion PR projects from the facing portion where the gate line GL faces the source electrode SE to outside beyond the edge of the source electrode SE.

As mentioned above, in the liquid crystal display according to this embodiment, the convex portion PR is provided in place of the cutout portion RE of the short ring circuit SR of the liquid crystal display in the first embodiment. In the liquid crystal display device according to this embodiment, the structure thereof is the same as that of the above-mentioned first embodiment except this point.

Also in the case of providing the convex portion PR in place of the cutout potion RE, the thickness of the insulating layer L1 becomes thin along the edge of the electrode in which the convex portion RE is provided. That is, a step portion of the insulating layer L1 is formed. Accordingly, the insulating layer L1 between the edge of the gate electrode GE and the source electrode SE or drain electrode DE formed on the gate electrode GE becomes thin. Therefore, when the static electricity which has large energy is impressed to the gate line GL or common wiring COM like the above-mentioned first embodiment, the static electricity is controlled one by one by the first circuit SR1 to the fourth circuit SR4 of the short ring circuit SR. Thereby, it is avoidable that the electric conductive layer, the resin layer, etc., arranged in the active area AA are destroyed by the static electricity.

In addition, it is known that the static electricity impressed to the electrode flows along the surface of the electrode. Therefore, it is desirable for the edge of the electrode along the concave portion RE to cross the edge of the electrode arranged thereon.

According to this embodiment, a reliable liquid crystal display can be supplied without reducing the manufacturing yield. Moreover, it is not necessary to prepare additional manufacturing processes for forming the above-mentioned short ring circuit SR as well as the first embodiment.

In addition, although the above-mentioned first and second embodiments explain about the short ring circuit SR provided in the gate line GL pulled out to outside from the active area AA, the position in which the short ring circuit SR is provided is not limited to this. The short ring circuit SR may be provided in any wirings drawn from the active area AA to outside. Accordingly, the short ring circuit SR may be formed, for example, in the source line SL pulled out to the outside of the active area AA, and also may be provided in other electric conductors formed on the substrates.

Moreover, in the above-mentioned first and embodiments, although the short ring circuit SR is equipped with the first circuit SR1 to the fourth circuit SR4, the structure thereof is not restricted to this one. Since each of the first circuit SR1 to the fourth circuit SR4 can attenuate the static electricity energy impressed, even if only the first circuit SR1 is provided, the static electricity impressed to the gate line GL can be controlled by electrically connecting the drain electrode DE of the first circuit SR1 with the common wiring COM. Furthermore, a case where only the first circuit SRI. and the second circuit SR2 are provided may be applicable to achieve the effect. Also, a case where only the first circuit SR1 and the third circuit SR3 are provided may be applicable. In the case, the drain electrode DE of the third circuit SR3 is connected with the source electrode SE of the first circuit SR1 so that the drain electrode DE of the third circuit SR3 crosses the gate line GL. In these cases, the same effects as the above-mentioned first and second embodiments can be acquired.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A display device, comprising:
an array substrate including an active area and a peripheral region surrounding the active area;
a first wiring line pulled out from the active area;
a first metal wire formed in the same layer as the first wiring line in the peripheral region; and a second metal wire formed on the first metal wire through a first insulating layer, wherein the first metal wire includes a recess portion provided at a location in which an edge of the first metal wire crosses an edge of the second metal wire.

2. The display device according to claim 1, wherein the first metal wire substantially orthogonally crosses the second metal wire.

3. The display device according to claim 1, further comprising a short ring circuit, wherein the short ring circuit includes:
a first electrode formed in the same layer as the first wiring line,
a semiconductor layer on the first electrode,
a second electrode, a portion of the second electrode facing the first electrode through the first insulating layer and arranged on the semiconductor layer, and
a third electrode arranged on the semiconductor layer in the same layer as the second electrode, and
the first metal wire includes the first wiring line and the first electrode.

4. The display device according to claim 3, further comprising a second wiring line arranged to surround the active area in the peripheral region, wherein the second metal wire includes the second wiring line, and the second and third electrodes of the short ring circuit.

5. The liquid crystal display device according to claim 3, further comprising a seal material arranged to surround the active area, wherein the short ring circuit is arranged between the seal material and the active area, and a second insulating layer is arranged on the second and third electrodes.

6. A display device, comprising:
an array substrate including an active area and a peripheral region surrounding the active area;
a first wiring line pulled out from the active area;
a first metal wire formed in the same layer as the first wiring line in the peripheral region; and
a second metal wire formed on the first metal wire through a first insulating layer, wherein
the first metal wire includes a convex portion provided at a location in which an edge of the first metal wire crosses an edge of the second metal wire.

7. The display device according to claim 6, wherein the first metal layer substantially orthogonally crosses the second metal layer.

8. The display device according to claim 6, further comprising a short ring circuit, wherein the short ring circuit includes:
a first electrode formed in the same layer as the first wiring line,
a semiconductor layer on the first electrode,
a second electrode, a portion of the second electrode facing the first electrode through the first insulating layer and arranged on the semiconductor layer, and
a third electrode arranged on the semiconductor layer in the same layer as the second electrode, and
the first metal wire includes the first wiring line and the first electrode.

9. The display device according to claim 8, further comprising a second wiring line arranged to surround the active area in the peripheral region, wherein the second metal wire includes the second wiring line, and the second and third electrodes of the short ring circuit.

10. The liquid crystal display device according to claim 8, further comprising a seal material arranged to surround the active area, wherein the short ring circuit is arranged between the seal material and the active area, and a second insulating layer is arranged on the second and third electrodes.

11. A display device, comprising:
an array substrate including an active area and a peripheral region surrounding the active area;
a first wiring line pulled out from the active area;
a first metal wire formed in the same layer as the first wiring line in the peripheral region; and
a second metal wire formed on the first metal wire through a first insulating layer, wherein
the first metal wire includes a recess portion provided at a location in which an edge of the first metal wire crosses an edge of the second metal wire, and
the first metal wire is electrically connected with the second metal wire in the circumferences of the recess portion when a static electricity is impressed between the first metal wire and the second metal wire by break down of a step portion of the first insulating layer.

12. The display device according to claim 11, wherein the first metal layer substantially orthogonally crosses the second metal layer.

13. The display device according to claim 11, further comprising a short ring circuit, wherein the short ring circuit includes:
a first electrode formed in the same layer as the first wiring line, a semiconductor layer on the first electrode,
a second electrode, a portion of the second electrode facing the first electrode through the first insulating layer and arranged on the semiconductor layer, and
a third electrode arranged on the semiconductor layer in the same layer as the second electrode, and
the first metal wire includes the first wiring line and the first electrode.

14. The display device according to claim 13, further comprising a second wiring line arranged to surround the active area in the peripheral region, wherein the second metal wire includes the second wiring line, and the second and third electrodes of the short ring circuit.

15. The liquid crystal display device according to claim 13, further comprising a seal material arranged to surround the active area, wherein the short ring circuit is arranged between the seal material and the active area, and a second insulating layer is arranged on the second and third electrodes.

16. A display device, comprising:
an array substrate including an active area and a peripheral region surrounding the active area;
a first wiring line pulled out from the active area;
a first metal wire formed in the same layer as the first wiring line in the peripheral region; and
a second metal wire formed on the first metal wire through a first insulating layer, wherein
the first metal wire includes a convex portion provided at a location in which an edge of the first metal wire crosses an edge of the second metal wire, and
the first metal wire is electrically connected with the second metal wire in the circumferences of the convex portion when a static electricity is impressed between the first metal wire and the second metal wire by break down of a step portion of the first insulating layer.

17. The display device according to claim 16, wherein the first metal layer substantially orthogonally crosses the second metal layer.

18. The display device according to claim 16, further comprising a short ring circuit, wherein
the short ring circuit includes:

a first electrode formed in the same layer as the first wiring line, a semiconductor layer on the first electrode, a second electrode, a portion of the second electrode facing the first electrode through the first insulating layer and arranged on the semiconductor layer, and a third electrode arranged on the semiconductor layer in the same layer as the second electrode, and the first metal wire includes the first wiring line and the first electrode.

19. The display device according to claim 18, further comprising a second wiring line arranged to surround the active area in the peripheral region, wherein the second metal wire includes the second wiring line, and the second and third electrodes of the short ring circuit.

20. The liquid crystal display device according to claim 18, further comprising a seal material arranged to surround the active area, wherein the short ring circuit is arranged between the seal material and the active area, and a second insulating layer is arranged on the second and third electrodes.

21. A liquid crystal display device, comprising:

an array substrate including an active area formed of a plurality of pixel electrodes arranged in a matrix, a first wiring line pulled out from the active area, and a short ring circuit provided in a peripheral portion of the active area;

a counter substrate arranged facing the array substrate and including a common electrode facing the pixel electrode; and a liquid crystal layer held between the array substrate and the counter substrate; wherein the short ring circuit includes:

a first electrode formed in the same layer as the first wiring line, a semiconductor layer on the first electrode, a second electrode, a portion of the second electrode facing the first electrode through a first insulating layer and arranged on the semiconductor layer, a third electrode arranged on the semiconductor layer in the same layer as the second electrode, and the first electrode includes a convex portion arranged under the second electrode projecting from an edge of the second electrode.

22. The liquid crystal display device according to claim 21, the convex portion is provided at a location in which an edge of the second electrode crosses an edge of the first electrode.

23. The liquid crystal display device according to claim 21, further comprising a second wiring line so as to surround the active area, wherein the second electrode or the third electrode is electrically connected with the second wiring line.

24. The liquid crystal display device according to claim 21, further comprising a seal material arranged so as to surround the active area, wherein the short ring circuit is arranged between the seal material and the active area, and a second insulating layer is arranged on the second and third electrodes.

25. A liquid crystal display device, comprising:

an array substrate including an active area formed of a plurality of pixel electrodes arranged in a matrix, a first wiring line pulled out from the active area, and a short ring circuit provided in a peripheral portion of the active area;

a counter substrate arranged facing the array substrate and including a common electrode facing the pixel electrode; and a liquid crystal layer held between the array substrate and the counter substrate;

wherein the short ring circuit includes:

a first electrode formed in the same layer as the first wiring line, a semiconductor layer on the first electrode, a second electrode, a portion of the second electrode facing the first electrode through a first insulating layer and arranged on the semiconductor layer, and the first insulating layer including a step portion formed between the first electrode and the second electrode and having a thinner thickness than other portions of the first insulating layer, and a third electrode arranged on the semiconductor layer in the same layer as the second electrode; and wherein the first electrode includes a convex portion arranged under the second electrode projecting from an edge of the second electrode, and the first electrode is electrically connected with the second electrode in a circumference of the concave portion when a static electricity is impressed between the first electrode and the second electrode by break down of the step portion of the first insulating layer.

26. The liquid crystal display device according to claim 25, the convex portion is provided at a location in which an edge of the first electrode crosses an edge of the second electrode.

27. The liquid crystal display device according to claim 25, further comprising a second wiring line to surround the active area, wherein the second electrode or the third electrode is electrically connected with the second wiring line.

28. The liquid crystal display device according to claim 25, further comprising a seal material arranged to surround the active area, wherein the short ring circuit is arranged between the seal material and the active area, and a second insulating layer is arranged on the second and third electrodes.

* * * * *